United States Patent [19]

Lonsway et al.

[11] Patent Number: 5,125,626

[45] Date of Patent: Jun. 30, 1992

[54] POOL TABLE DOLLY

[76] Inventors: Raymond L. Lonsway, 400 Shadydale, Canfield, Ohio 44406; Michael M. Saadeh, 114 S. Kimberly, Youngstown, Ohio 44515

[21] Appl. No.: 653,021

[22] Filed: Feb. 8, 1991

[51] Int. Cl.$^5$ .............................................. B60P 1/48
[52] U.S. Cl. .................................................. 254/8 R
[58] Field of Search ............... 254/89 R, 89 H, 2 R, 254/2 B, 2 C, 8 R, 8 B, 8 C, 45, 47; 414/458, 495, 459, 427

[56] References Cited

U.S. PATENT DOCUMENTS

| | | | |
|---|---|---|---|
| 1,850,969 | 3/1932 | Russell et al. | 254/2 R |
| 2,508,661 | 5/1950 | Campbell | 414/458 |
| 2,904,308 | 9/1959 | Vergara | 254/8 R |
| 3,486,650 | 12/1969 | Boone | 414/458 |
| 3,504,889 | 4/1970 | Wyrough | 254/2 R |
| 3,881,689 | 5/1975 | Bury et al. | 254/45 |
| 4,090,689 | 5/1978 | Enzenauer et al. | 254/89 R |
| 4,475,714 | 10/1984 | Heiskell et al. | 254/89 H |
| 4,491,452 | 1/1985 | Matovich | 254/89 R |

Primary Examiner—Robert C. Watson
Attorney, Agent, or Firm—Pearne, Gordon, McCoy & Granger

[57] ABSTRACT

A specialty wheeled dolly for moving a pool table across a floor surface that includes a rectangular frame supported on four wheels and a set of independently operated mechanical jacks on opposite sides of the frame. The dolly has an elevating platform which has a relatively high nominal height and the jacks have a stroke which is relatively small in comparison to the height. The geometry of the dolly permits it to be conveniently rolled under a pool table and allows the user to lift only a portion of the weight of the table with operation of each jack. A jack is operated by a single stroke step-on actuating lever.

4 Claims, 2 Drawing Sheets

POOL TABLE DOLLY

BACKGROUND OF THE INVENTION

The invention relates to a device for moving heavy objects and, in particular, to a specialty four-wheel dolly for moving a pool table from place to place in a room or building.

PRIOR ART

Commercial establishments such as bars, lounges, nightclubs, restaurants, recreational centers and the like often provide one or more pool tables for their patrons. From time to time there is a need to move a table from one area to another for various purposes. Such purposes include temporarily providing additional floor space for special events such as a dance, for floor cleaning and polishing, or for other reasons. Typically, it is impractical to hire one or two professional movers to move a pool table simply from one place to another in a room or building. Often, personnel at the establishment where a pool table is situated are not skilled or strong enough to move a table with or without regular moving equipment. Attempts by such personnel to do so can result in damage to the pool table and/or floor surface as well as a loss of a level table condition. Consequently, there has been a need for a practical way to competently move such pool tables with the labor of a person of limited experience, skill and/or physical strength.

Specialty dollies are known, for example, from U.S. Pat. Nos. 4,934,720, 4,331,324, 3,768,676, 2,739,785, 2,513,440, 1,850,969, 1,827,692, 1,134,113, 1,056,729 and 763,027. In general, these dollies are structurally inadequate to be received under and bear the weight of a pool table in a convenient and efficient manner.

SUMMARY OF THE INVENTION

The invention provides a wheeled dolly that can be used by one person for moving a pool table from point to point across a floor space while requiring little physical effort and no special skill. The dolly includes a base preferably supported on four wheels and an elevating platform supported on the base. In accordance with the invention, the height of the platform is relatively large, being, for example, a major fraction of either the length or width of the dolly while the elevating movement of the platform is relatively small. The disclosed geometry of the dolly reduces the effort necessary to raise the pool table off the floor for transport so that the requisite force is manageable for even a person of limited physical strength.

In the disclosed embodiment, the platform is supported by a plurality of toggle jacks spaced on the perimeter of the base. The jacks which are interposed between the base and the platform can be individually operated by a person so that only a portion of the weight of the pool table need be lifted at a time. The disclosed jacks are raised by simply stepping on an associated lever with a relatively low force and through a relatively short stroke. With the table raised by the platform, the weight of the table is transferred to the wheels of the dolly and it is an easy task to push the pool table from one place to another.

DESCRIPTION OF THE PREFERRED EMBODIMENT

Figure 1:
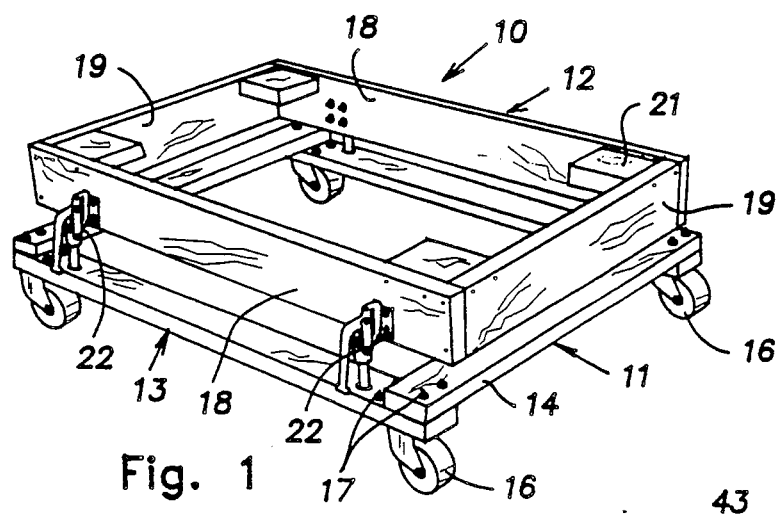
FIG. 1 is a perspective side and end view of a pool table dolly constructed in accordance with the invention.

A dolly 10 having a frame formed of a generally rectangular base 11 and an overlying generally rectangular platform 12 is illustrated in FIG. 1. In the illustrated embodiment, the base and platform are formed of dimensional lumber of pine or fir. The base is constructed of lengths of two-by-fours (1.5 inch by 3.5 inch) and the platform is constructed of lengths of two-by-sixes (1.5 inch by 5.5 inch). The base 11 includes parallel side bars 13 and cross pieces 14. The cross pieces have their ends supported on a lap joint with the ends of the side bars 13. Four castered or swivel wheels 16, of conventional construction, have their mounting plates secured to the underside of the base 11 with bolts 17 that also serve to hold the base side bars 13 and cross pieces 14 together.

Like the base 11, the platform 12 includes side bars 18 and cross pieces 19. The platform side bars 18 and cross pieces 19 are held together with suitable wood screws or other fastener means. Wood corner blocks 21 screwed or otherwise secured to the side bars 18 and cross pieces 19 serve to reinforce the platform 12.

Figures 4, 5:
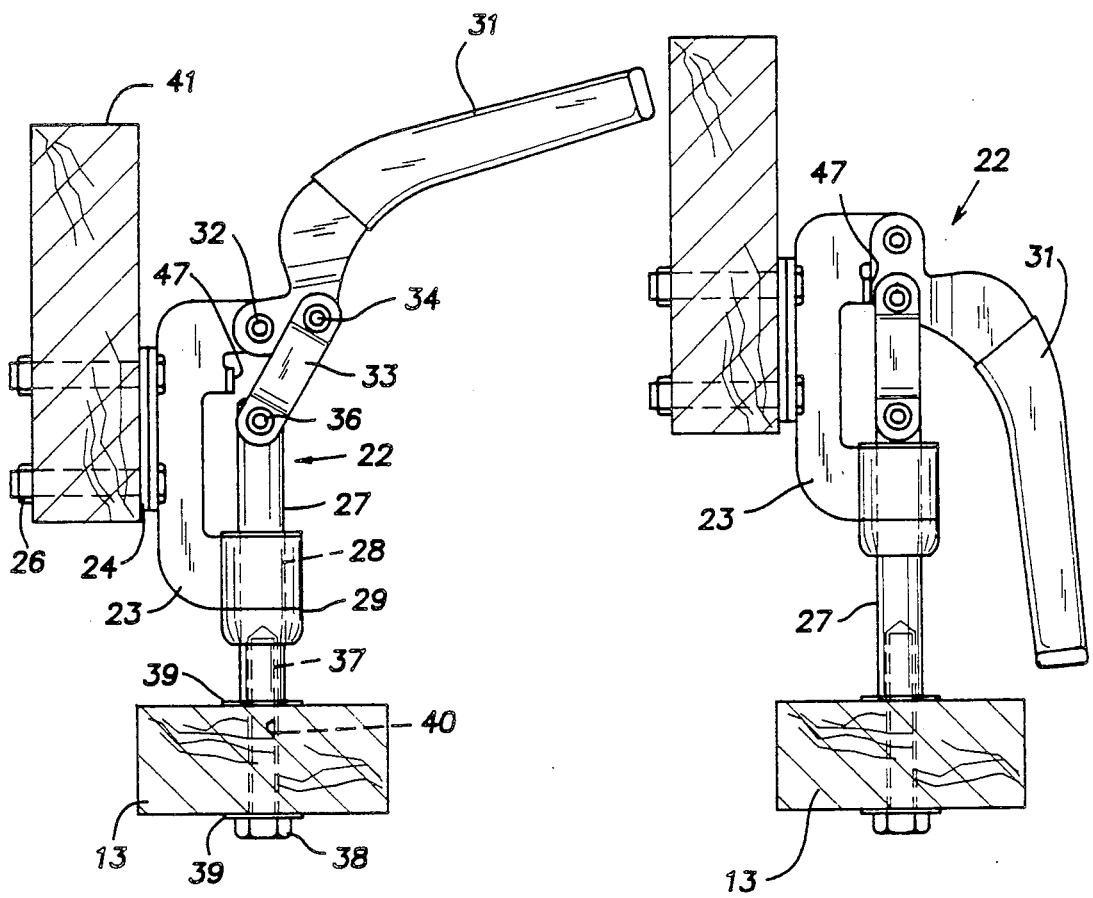
FIG. 4 is an enlarged elevational view of a typical foot actuated jack in a retracted position.
FIG. 5 is a view of the jack similar to FIG. 4 but in an extended or raised position.

The platform 12 is suspended on the base 11 for limited relative movement by a set of four jacks 22. As shown, the jacks 22 are arranged in pairs with one pair associated with each set of side bars 13, 18. The jacks 22 are formed of a commercially available product ordinarily used as a toggle clamp. A jack 22 typical of the four used on the dolly 10 is illustrated in FIGS. 4 and 5. The jack 22 is formed primarily of steel parts and has a C-shaped frame 23 with a mounting flange 24. The mounting flange 24 is fixed by bolts 26 to the outside of the associated platform side bar 18. A cylindrical actuating rod 27 is axially reciprocal in a central bore 28 of a vertical bushing 29 welded on the frame 23. An operating lever 31 is pivotal on a pin 32 on the upper end of the frame 23. A clevis-like double connecting link 33 is pivotal at one end on a pin 34 carried on the lever 31 and at an opposite end of a pin 36 carried on the upper end of the actuating rod 27. Pivotal movement of the operating lever 31 is converted by the connecting or clevis link 33 into extension and retraction movement of the rod 27. At its lower end, the rod 27 has an internally threaded bore 37. The rod 27 is connected to the underlying base side bar 13 by a bolt 38 that is assembled through a bore 40 in the side bar from beneath and through metal washers 39 on both the upper and lower faces of the side bar. The bolt 38 is threaded into the rod bore 37.

Figure 2:
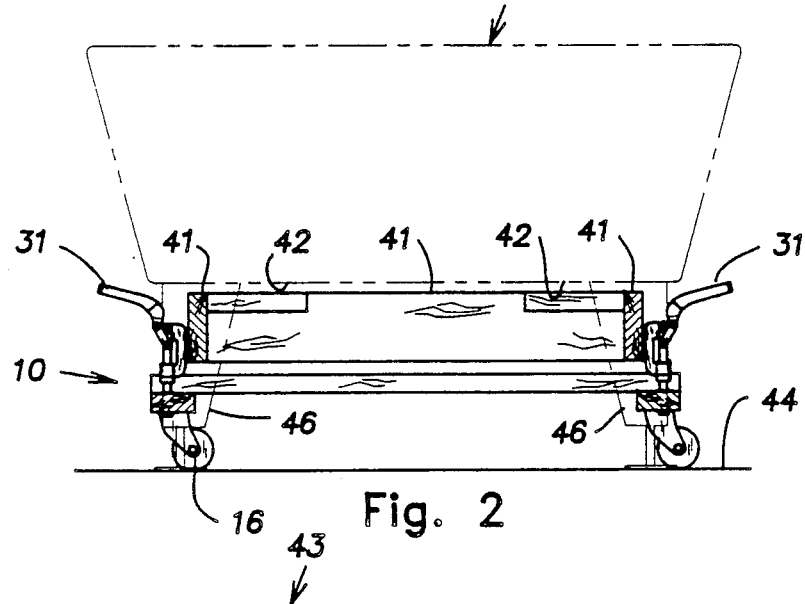
FIG. 2 is an end view of the dolly in retracted position under a pool table shown in phantom.
Figure 3:
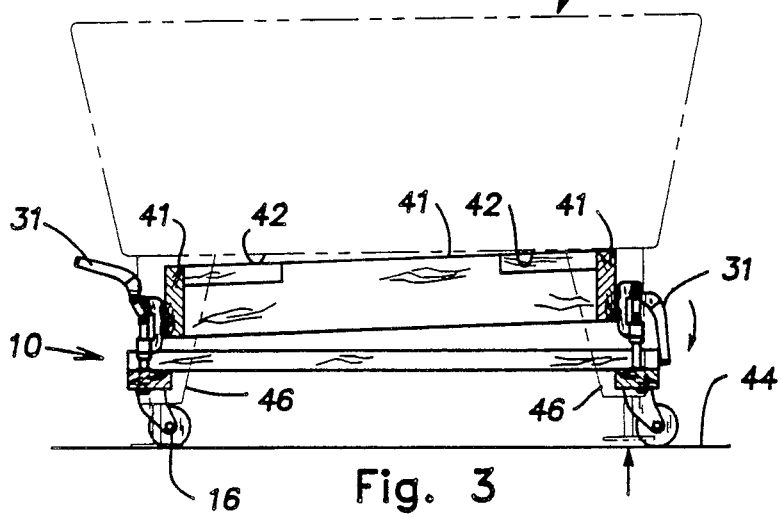
FIG. 3 is an end view similar to FIG. 2 with one side of the dolly and one side of the pool table elevated.

The various parts of the dolly 10 are proportioned so that when the jacks are retracted, as described below, upper surfaces 41 of the platform 12 are just slightly lower than underside surfaces 42 of a pool table 43 illustrated in phantom in FIGS. 2 and 3. From the drawings where the dolly 10 is generally drawn to scale, it will be seen that the nominal height of the dolly at the upper platform surfaces 41 in either retracted or extended positions of the jacks 22 is a major fraction, e.g. about ⅓, of the width of the dolly 10 measured from one base side bar 13 to the other. It will be understood from the explanation below, the stroke of the platform 12 between retracted and extended positions is relatively small, e.g. about ⅜ inch, in comparison to its nominal height at the upper surfaces 41 of about 15 inches off of a floor surface 44.

The dolly 10 is used to facilitate moving of the pool table 43, typically at a commercial establishment, from one floor area to another. Such moving may be necessary for temporary storage of the pool table to make use of its normal floor space for a purpose such as a special entertainment event or for cleaning or for other reasons. One person can easily operate the dolly and move the pool table 43. The dolly 10 is rolled on the floor 44 beneath the pool table 43 so that it is centered below the table and the side bars 18 are parallel to the length of the table and the operating levers 31 are exposed on the sides of the table between legs 46 of the table, pairs of the legs 46 being at opposite ends. This position is illustrated in FIG. 2. The jacks 22 are illustrated in their retracted positions in FIGS. 2 and 4. In this position, the jacks 22 support the platform at its lowest level which is sufficiently low to pass beneath the underside surfaces 42 of the pool table 43.

In this retracted position, the operating lever 31 is at its uppermost position adjacent the plane of the upper platform surfaces 41. Once the dolly 10 is properly centered beneath the pool table, the user steps on an operating lever 31 with his or her foot. FIG. 5 illustrates the operating lever 31 fully depressed and the associated jack 22 fully extended. The clevis link 33 and adjacent pinned area of the lever 31 form a toggle mechanism that locks slightly over center against a stop 47 holding the rod 27 in its extended position. As the rod 27 is extended by depression of the lever 31, the associated platform side bar 18 is elevated relative to the base side bar 13 thereby first contacting and then lifting the adjacent overlying portion of the pool table 43 a small distance of, for example, ⅜ inch. FIG. 3 illustrates an intermediate position of the platform 12 where only the jacks 22 of one side of the dolly 10 have been extended. It will be understood that, ideally, as shown in FIG. 3, only half the weight of the pool table 43 need be lifted at a time, so that the force required to depress any operating lever 31 is quite manageable despite a typical table weight of, for example, 750 pounds. It will be noted that each jack requires only one operating stroke, moving its lever 31 approximately 90 degrees, to achieve full extension of its rod 27 and elevation of the associated area of the platform side bar 18. The bores 40 in the base side bars 13 are sufficiently oversize of the bolts 38 to permit tilting of the platform 12 relative to the base 11 when only one side of the platform is raised.

When all of the jacks 22 are extended, the table 43 is raised sufficiently to bring its legs 46 off of the floor 44 and enable it to be rolled on the dolly wheels 16 to any desired location. The pool table can be lowered onto the floor 44 by reversing the procedure described above, engaging the individual levers 31 by the toe of the foot to release them from their toggle lock position: The force involved in raising a lever 31 by the toe is small since the weight of the table assists this movement. With all of the levers 31 raised and the jacks 22 retracted, the dolly can be rolled from beneath the pool table 43.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A dolly for moving a pool table across a floor comprising a generally rectangular base, a set of four wheels supporting the base for rolling across the floor, a generally rectangular platform above the base and of a length and width dimensions suitable for supporting the lower side of a pool table in a stable manner, a set of four jacks each connected between the base and the platform adjacent respective corners of the platform, connection means for the jacks between the base and platform being arranged to allow separate ones of the jacks to be operated independently of others, the jacks being operable to selectively raise and lower the platform between a retracted position and an elevated position, the platform having an upper support surface with a nominal height generally less in dimension than the width of the dolly, the jacks each being operable to raise or lower its respective corner of the platform relative to the base a distance which is small in comparison to the height of the support surface, the platform in the retracted position of the jacks being adapted to roll beneath a lower side of the pool table and in the extended position of the jacks being adapted to support the pool table from its lower side with the bottom of the pool table legs slightly above the floor surface so that the pool table can be rolled about the floor on the wheels of the dolly.

2. A dolly for moving a pool table across a floor surface comprising a generally rectangular frame having in plan view a width and a length and a set of four corners, a set of four wheels at the bottom of the frame, a support surface at the top of the frame for engaging a lower side of a pool table at points adjacent the corners of the frame, the height of the support surface above the bottom of the wheels being generally less in dimension than the width of the dolly, mechanical jack means for raising the support surface from a retracted position to an elevated position through a single stroke that is smaller than the height of the support surface above the bottom of the wheels, the jack means being arranged to be conveniently actuated by stepping on the same with the foot of the user, the dolly being constructed and arranged to roll under a conventional commercial pool table when the jack means is in its retracted position and to support such table through engagement between said support surface and a lower side of the pool table when the jack means is in its elevated position.

3. A dolly for moving a pool table across a floor comprising a generally rectangular frame having pairs of sides and ends intersecting at four corners, the sides and ends each having respective lengths, a set of four wheels supporting the frame, each wheel being adjacent one of the corners of the frame, pool table support surface means on the frame at a nominal height that is generally less in dimension than the length of one of the sides or ends, separate independently manually operable mechanical jack means on each side of the frame, the jack means on each side of the frame being operable to lift a portion of the weight of a pool table through an adjacent area of the support surface means in a limited movement that is small in comparision to the nominal height of the support surface means while allowing the legs of the pool table on a side of the pool table remote therefrom to temporarily remain on the floor surface whereby only one-half of the weight of the pool table is raised by an operative jack means so that the manual effort in operating the jack means is reduced, said jack means each having an operating lever and being arranged to develop said limited movement of said support surface area in a single stroke of said operating lever, said operating lever being arranged for foot operation.

4. A dolly as set forth in claim 3, wherein said jack means includes toggle locking means for releasably supporting its adjacent area support surface means in an elevated position.

* * * * *